United States Patent [19]
Brodrecht

[11] Patent Number: 6,050,066
[45] Date of Patent: Apr. 18, 2000

[54] BALE BAGGER

[76] Inventor: Gerald Brodrecht, R.R. #1, Thorsby, Alberta, Canada, T0C 2P0

[21] Appl. No.: 09/166,859

[22] Filed: Oct. 6, 1998

[30] Foreign Application Priority Data

Aug. 7, 1998 [CA] Canada ................................. 2244595

[51] Int. Cl.⁷ .................................................. B65B 43/42
[52] U.S. Cl. ................................................. 53/576; 53/567
[58] Field of Search ............................. 53/255, 257, 567, 53/576, 459

[56] References Cited

U.S. PATENT DOCUMENTS

| | | |
|---|---|---|
| 4,606,176 | 8/1986 | Cundall . |
| 4,686,817 | 8/1987 | Brodrecht et al. . |
| 4,888,937 | 12/1989 | Glenn ........................................ 53/567 |
| 4,945,715 | 8/1990 | Brodrecht . |
| 5,220,772 | 6/1993 | Koskela et al. . |
| 5,323,591 | 6/1994 | Inman et al. . |
| 5,385,002 | 1/1995 | Cundall . |
| 5,398,478 | 3/1995 | Inman et al. . |
| 5,421,144 | 6/1995 | Inman et al. . |
| 5,425,221 | 6/1995 | Pronovost et al. . |
| 5,469,693 | 11/1995 | Brodrecht ................................. 53/567 |

*Primary Examiner*—John Sipos
*Attorney, Agent, or Firm*—Murray E. Thrift; Adrian D. Battison

[57] ABSTRACT

A bale bagging apparatus is used for inserting bales in sequence into a tube of plastic film. The apparatus has a set of panels surrounding the bale at a bagging station of the apparatus and supporting the tube in a stretched state out of contact with the bale. As the bale passes through the bagging station, the tube is pulled off the panels and shrinks onto the bale. The bale support panel is equipped with a resilient sheet on the outer surface to distribute the stretching load over the bag to eliminate areas of high stress concentration on the bag. The bales are supported as they travel through the apparatus on two parallel, linear rails to minimize the draft force on the apparatus. The tube support panels pivot on axes that lie in a common plane perpendicular to the bale path.

11 Claims, 8 Drawing Sheets

FIG. 14 ns the bagging of bales of silage in tubes of plastic film.

BALE BAGGER

FIELD OF THE INVENTION

The present invention relates to the bagging of bales of silage in tubes of plastic film.

BACKGROUND

The practice of bagging bales of silage in large tubes of plastic film has developed as a method of maintaining the nutritional value of these bales during storage. A common practice has been to hold the tubes folded in multiple layers on a steel drum and to push the bales through the drum to pull the tube off the drum to cover the bales. With the rigid drum, the drum and the tube that mounts on it must be significantly larger than that of the bales in order to accommodate varying bale sizes and shapes. The oversized tube admits excess air into the tube and leaves the loose tube subject to wind damage.

In prior apparatus designed by the applicant, as exemplified by U.S. Pat. No. 4,945,715, issued Aug. 7, 1990, and U.S. Pat. No. 5,469,693, issued Nov. 28, 1995, the bales pass through a collapsible tunnel carrying the tube of film. The collapsible tunnels allow the use of a bagging tube with a smaller size, more closely approximating that of bales, than does a fixed diameter drum type tunnel.

The smaller tube has a number of advantages, including less air inclusion with the silage, reduced wind damage because of the tighter fit and the reduced material cost of the thinner, smaller bags that can be used.

Another type of apparatus that has been used in an attempt to achieve the benefits of a close fitting tube is the stretch bagger that uses plural fingers spaced circumferentially around the bales to stretch the tube to a size larger than the bales and then to release the tube to shrink onto the bales as it leaves the fingers. One device of this type is described in Koskela et al U.S. Pat. No. 5,220,772, issued Jun. 22, 1993. Baggers of this type must produce a large amount of stretch in the tube, sufficient that a bale may pass through without contacting the flat tube segments between the fingers. This is further complicated by the use of a flat pan on the bottom to support the bale and protect the tube from contact with the bale. The tube does not stretch well across the pan, so that additional stretch is required around the rest of the tube. The requisite high stretch can produce high stress concentrations in the plastic tube where it rides over the fingers. This may in turn produce stretch marks in the tube, which are undesirable lines of weakness. It has also been found with some machines of this sort that the stress on the fingers can be sufficient that the fingers will bend, allowing the folded tube to slide off the fingers prematurely.

Some prior art baggers have conical tube supports, either tunnels or fingers, which may result in the tubes sliding off the supports during dilation. With a conical support, the tube can crowd rearwardly so that inner layers roll up to the rear on the outer layers, pinching the outer layers. When film is pulled out from under the point where it is pinched, it tears. To address these problems, some finger type machines have fingers with a slight outwards slope towards their terminating ends. These fingers are bent resiliently inwards when the tube is stretched. As the tube comes off the fingers, the pressure from the multiple layers of tube is reduced and the fingers spring outwards, increasing the stress on the plastic film towards the end of the tube.

With finger type machines, the bag is spaced further from the bale where it travels over the fingers than it is in the "flats" between the fingers. The bag actually adopts a polygonal shape on the fingers. This means that bag material being drawn over the fingers must travel a longer path to the bale than the bag material between the fingers. This requires additional longitudinal stress and additional longitudinal stretch of the bag material drawn over the fingers. This can result in longitudinal stretch marks in the bag.

To accommodate bales of different sizes and shapes, some finger type machines permit the fingers to be positioned at varying radial positions with respect to a nominal centre of the bagging station. While this will alter the size and shape of the tube at the bagging station, it has been found that when the tube is stretched, the tension is not uniform circumferentially around the tube. This requires the use of a heavier and more expensive tube to accommodate the high tension zones.

The present invention relates to certain improvements in bale bagging apparatus that address certain of the concerns with the prior baggers.

SUMMARY

According to one aspect of the present invention there is provided a bale bagging apparatus for inserting bales sequentially into a tube of plastic film, the apparatus comprising:

means for passing the bales in sequence along a bale path through a bagging station from an upstream side to a downstream side of the bagging station;

tube support means for supporting the tube of plastic film in a folded condition around the bagging station, the tube support means comprising a plurality of rigid panels spaced around the bagging station, each having a width dimension oriented laterally of the bale path at the bagging station, each panel having a convex lateral curvature;

a plurality of flexible sheets spaced around the bagging station inside the tube support means, each sheet extending laterally beyond adjacent sides of two adjacent panels and overlapping the adjacent panels; and tube opening means for moving at least selected ones of the panels radially with respect to the bale path.

The multi-segment tube support and the internal sheets protect the tube from damage caused by contact with a moving bale. The tube need not be dilated to a size much larger than the bale. This apparatus opens the tube using broad panels that distribute the loading over the complete tube and do not produce undesirable stretch lines in the tube. Another benefit of the round tunnel is that it bends over stems projecting from the bale so that they don't poke through the plastic film of the tube.

According to another aspect of the present invention there is provided a bale bagging apparatus for inserting bales in sequence into a tube of plastic film, the apparatus comprising a plurality of elongate tube support members spaced circumferentially around a bagging station, and tube support moving means comprising two actuators connected to each tube support at respective positions spaced apart along a bale path through the bagging station, the actuators for each tube support being independently actuable for moving the tube support radially with respect to the bale path and inclining the tube support along the bale path.

Because the panels have independently movable longitudinally spaced mounting points, both the position and the angle of slope of each tube support can be varied to suit the bale size and shape. The taper of the tube support tunnel can be selected for optimum tube withdrawal. The angle must be small enough that the tube will not slip off the support. The passage for the bale through the bagging station is the minimum possible size, allowing the use of the smallest possible tube opening to receive the bale. The actuators are preferably hydraulic cylinders.

According to another aspect of the present invention there is provided a bale bagging apparatus for inserting bales in sequence into a tube of plastic film as the bales travel in sequence along a bale path through a bagging station, the apparatus comprising:

tube dilating means including
a plurality of tube support members spaced circumferentially around the bagging station;
means for pulling each tube support member outwardly from the bagging station; and
support centring means for positioning the tube dilating means to pull the tube support members radially with respect to a centre line of the bagging station.

It has been found that centring the tube support members to pull radially from the centre of the bagging station provides a more uniform tension around the tube, while allowing adjustment of the tube supports to accommodate bales of different sizes and shapes.

The preferred apparatus embodying this aspect of the invention is a tunnel type apparatus with top and bottom opposed panels and two opposed side panels. The side panels move towards and away from one another. The spacing between the top and bottom panels can be adjusted, for example by moving the top panel up or down. This shifts the centre of the bagging station up or down, leaving the side panels below or above that centre. To compensate for this, the side panels are also movable vertically. The four point arrangement is easily adjusted and does not require angular adjustments as would be required for a finger type machine.

According to a further aspect of the present invention there is provided a method of installing and dilating a bale bagging tube on a bale bagger, comprising:

providing a plurality of tube support members distributed circumferentially around a bagging station;
orienting the tube support members generally parallel to one another;
placing the tube on the tube support members;
pulling the tube support members outwardly from the bagging station and thereby dilating the tube while maintaining the generally parallel orientation of the tube support members; and
orienting the tube support members to converge from an upstream end to a downstream end.

This method of dilating the tube ensures that the tube is dilated without sliding off the tube supports and without the inner layers rolling over on and pinching the outer layers.

BRIEF DESCRIPTION OF THE DRAWINGS

In the accompanying drawings, which illustrate an exemplary embodiment of the present invention.

DETAILED DESCRIPTION

Figure 1:
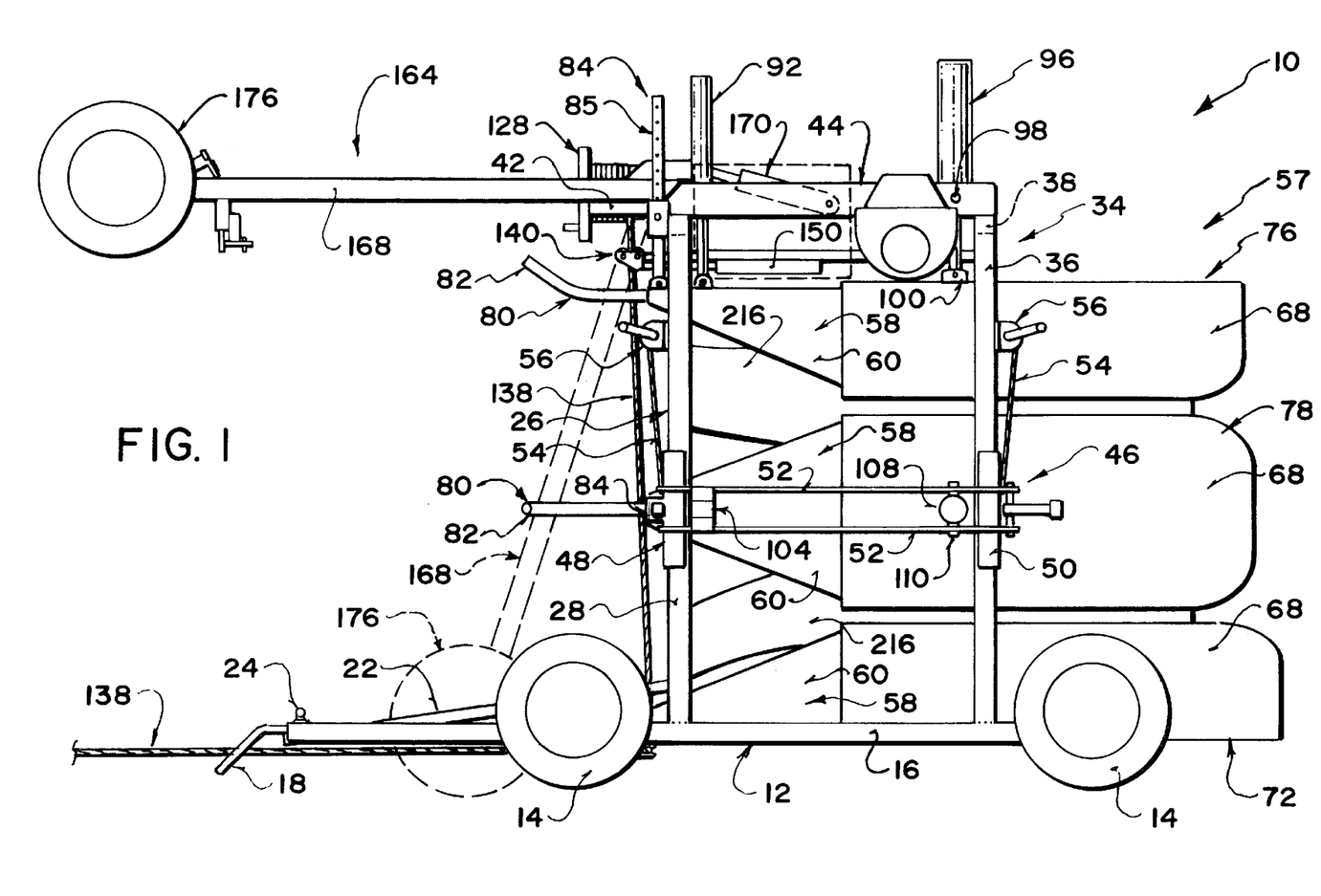
FIG. 1 is a side view of a bagger according to the present invention.
Figure 2:
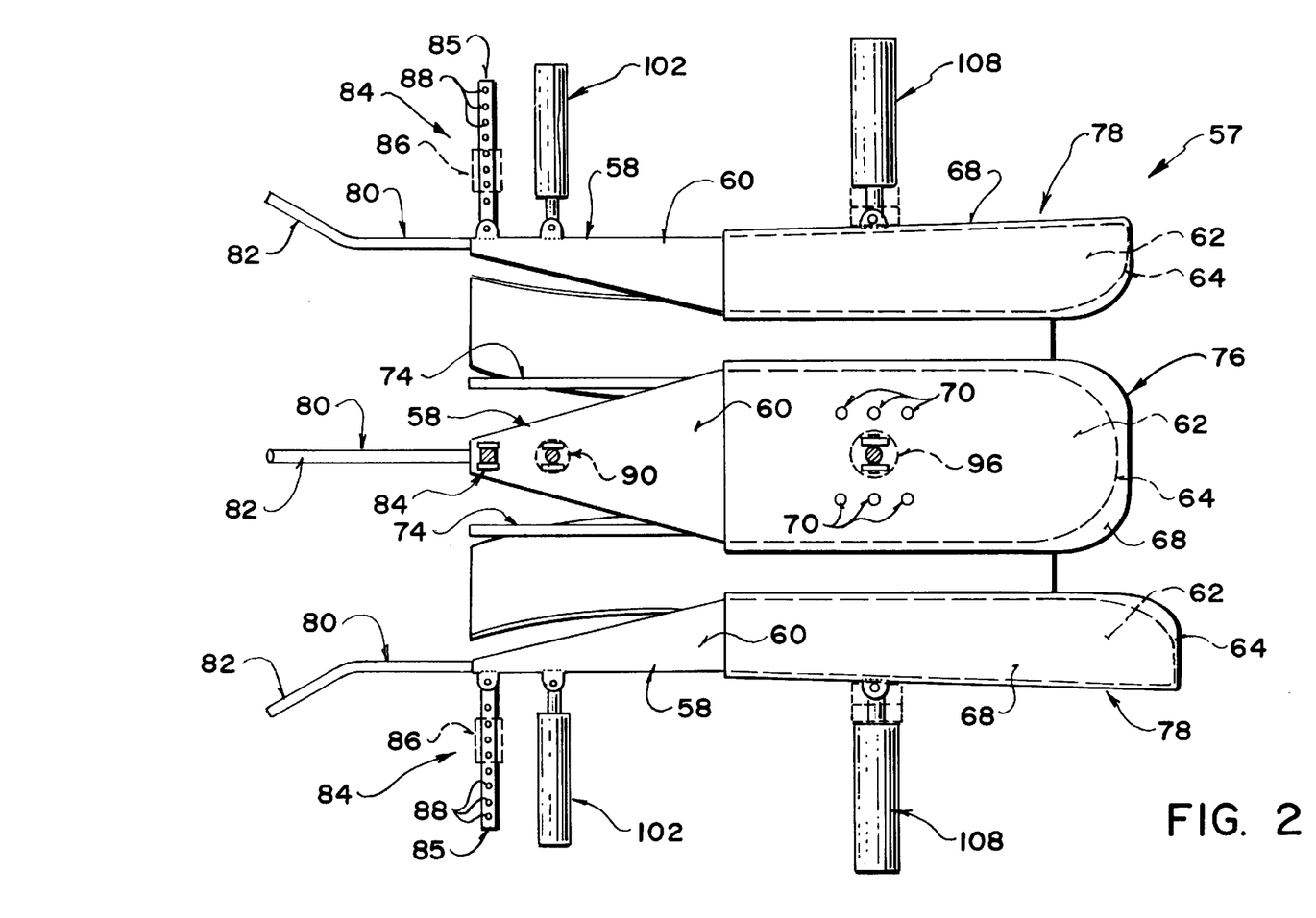
FIG. 2 is a schematic plan view of the bagger showing the panels and the tube opening means.

Referring to the accompanying drawings, there is illustrated a bale bagger 10 having a base frame 12 mounted on a set of four ground wheels 14. The base frame has two spaced apart side members 16, each carrying, at the leading end, an outwardly and downwardly sloping guide bar 18 for engaging the end of a bale to be bagged. The base frame 12 has a front cross member 20 (FIG. 3) spaced behind the front pair of wheels 14. Two pickup rails 22 extend from positions adjacent the front of the side members and slope upwardly and inwardly from the bottom of the side members to provide a convergent throat at the leading end of the bagger. From the throat, the pickup rails slope upwardly and rearwardly, parallel to one another and to a position above the front cross member 20. The rails then extend downwardly to the front cross member and are fixed to the cross member. Two hitch balls 24 are mounted on the side members, near their front ends, to be connected to a tow bar for transport.

Figure 3:
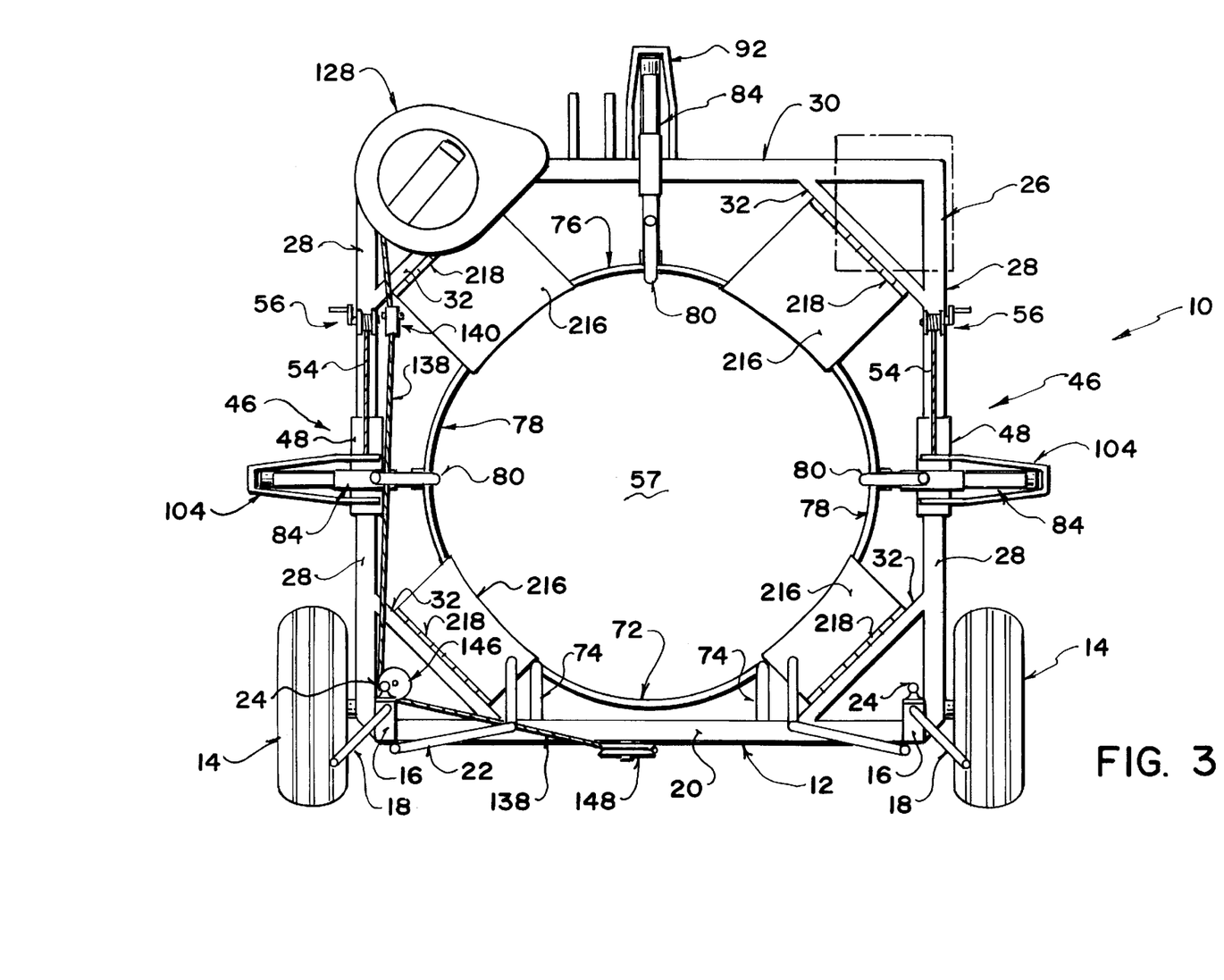
FIG. 3 is a partial front view of the bagger.

Mounted on the base frame 12, above the front cross member 20 is a square front arch 26. The arch has vertical side members 28 and a horizontal top member 30. Corner braces 32 brace all of the corners of the front arch, between the top member 30 and the side members 38, and between the side members 28 and the front cross member 20 of the base frame.

A similar back arch 34 is mounted on the base frame in front of the rear air of wheels 14. The back arch is of the same configuration as the front arch. It has two spaced side members 36, a horizontal top member and corner braces bracing the corners between the top and side members and between the side members and a rear cross member of the base frame.

The two arches are joined by a beam 42 that is connected to their upper corners between the top and side members of the two arches. This beam projects forwardly from the front arch. The top members of the two arches are also linked by two spaced, upright plates 44.

The side members 28 and 36 on each side of the bagger carry respective side support assemblies 46. Each assembly includes a front channel 48 engaged slidably along the front arch side member 28 and a back channel 50 engaged slidably on the back side member 36. These channels are joined by vertically spaced, laterally oriented plates 52. The position of the side support assemblies 46 on the side members is varied using two cables 54 wound on winches 56 mounted on the side members above the side support assembly. The cables extend from the winches down to the channels 48 and 50. The winches and cables are used to adjust the positions of the side support assemblies for the reasons discussed more fully in the following. In other embodiments, the winches are replaced with hydraulic cylinders or a cylinder in combination with a linkage joining the side supports. Other equivalents, for example a lead screw may also be used.

Figures 9, 10:
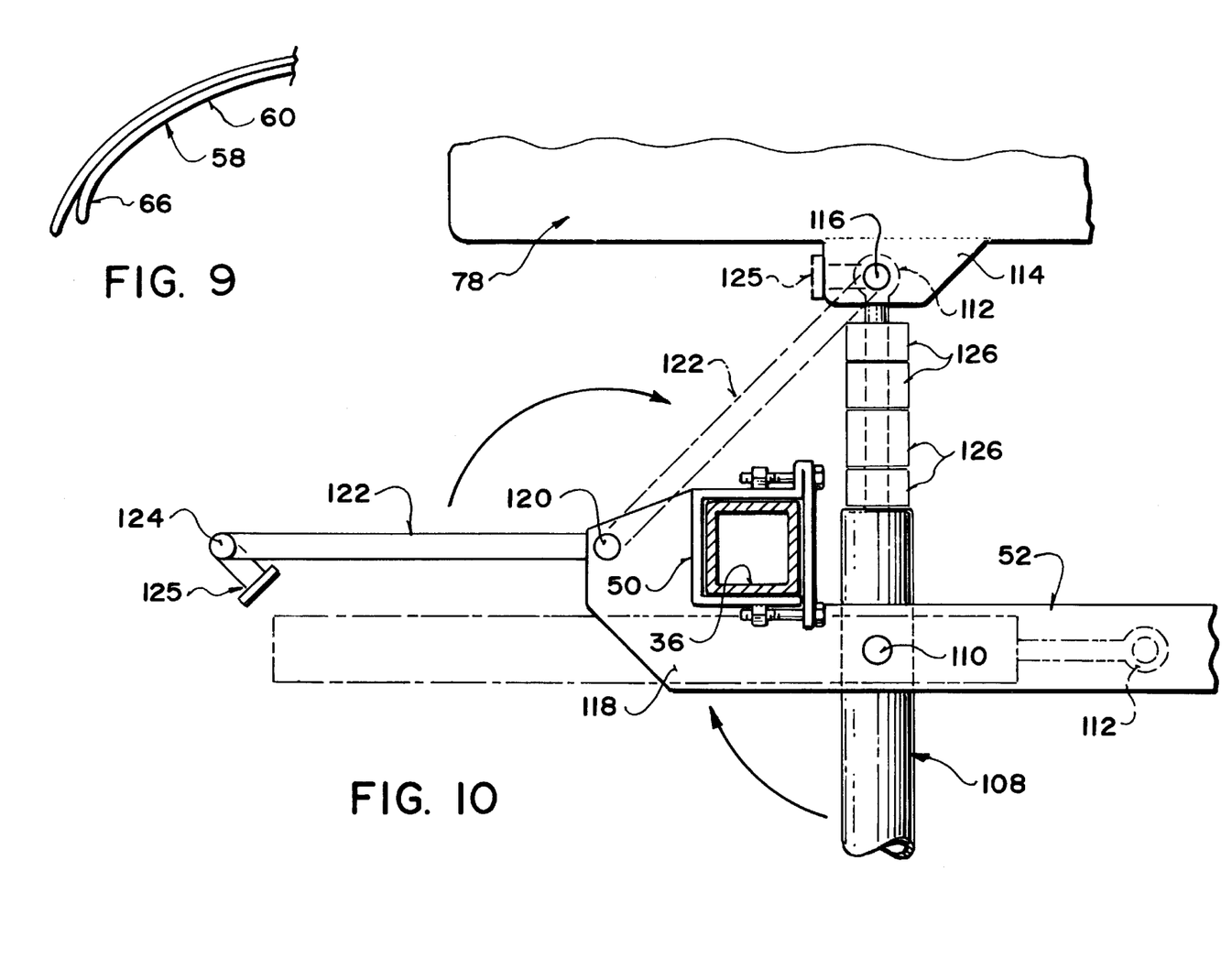
FIG. 9 is a partial end view of a panel.
FIG. 10 is a detail of a side panel cylinder and transport arm mechanism.

The bale bagger includes a bagging tunnel 57 supported by the arches 26 and 34. The tunnel includes a set of four curved metal panels 58 arranged in an annular array. Each panel has a tapered leading section 60 and a parallel side and rear section 62. The trailing end 64 of the panel is convex with a large radius curvature which assists in eliminating local stresses on the bagging tube when it is drawn off the tunnel. As illustrated most particularly in FIG. 9, the side edges 66 of the panel are rolled inwardly from the curve of the main panel.

Each of the metal panels is covered with a flexible, self-supporting sheet 68 of plastic material. This material has a relatively low co-efficient friction with the plastic material of the bagging tube to inhibit sticking of the tube material to the metal panels. The sheets 68 are slightly wider than the metal panels and extend slightly beyond their rear edges to prevent direct contact between the metal panel and the plastic bag.

The plastic sheets are mounted in place on the metal panels by carriage bolts 70, near the center of the panel and the sheet and in front of the back arch 34 so that behind the back arch the outer surface of the plastic sheets is completely smooth.

The composite tunnel components, including the metal panel and the plastic sheet include a base component 72 mounted on the base frame 12. This tunnel component has two guide rails 74 extending along its inner side, near the side edges of the metal panel. At the front, the guide rails slope down to the front and are connected to the front cross member 20. The tunnel also includes a top panel 76 and two side panels 78. Each of these includes a guide rail 80 that extends partway along the centre of the metal panel, on the inside. Each guide rail 80 has a leading end 82 that slopes outwardly to the front. The guide rails 74 and 80 co-operate with the pickup rails 22 in guiding a bale into the tunnel.

Each of the top and side panels is supported with a front support 84. This is a square tube 85 fixed to the leading end of the metal panel and extending through a sleeve 86 fixed to the top member 30 of the front arch 26 in the case of the top panel and to the side support assemblies 46 in the case of the side panels. Through holes 88 in the tubes 85 are spaced apart to accommodate cross pins that engage the sleeves to set the position of the panels at the front end.

Adjacent the front support 84 on the top panel 76 is a hydraulic cylinder 90. This has its cylinder end supported in a frame 92 mounted on the two top plates 44. The piston rod is coupled to the front end of the top panel 76 by a lug on the panel and a cross pin.

In front of the back arch 34, the top panel 76 is supported by a hydraulic cylinder 96. This cylinder extends between the plates 44 and is connected to them by lateral pins 98. The free end of the piston rod is connected to the top panel 76 by a coupling 100.

At the front of each side panel 78 is a hydraulic cylinder 102 supported in a frame 104. The frame is pivotally mounted on the side support assembly plates 52. The piston rod of the cylinder is pinned to a lug on the side panel 78. For transportation, the piston rod connection can be released and the piston and frame folded to lie inside the side support assembly 46.

At the back end of each side panel is a hydraulic cylinder 108 connected to the support assembly plates 52 by upright pins 110. The end of the piston rod has an upright sleeve 112 that fits between two lugs 114 on the side panel and is held in place by a through pin 116. By withdrawing the pin 116, the cylinder can be pivoted to the transport position illustrated in broken line in FIG. 10.

A support assembly is used to support the panel when the cylinder is in the transport position. This includes a pair of plates 118 mounted on the side member of channel 50. These plates carry a pin 120 which pivotally mount and support bar 122. The support bar has a socket 124 on its outer end to pivot into place between the lugs 114 to receive the pin 116. A stop 125 on the support bar engages the ends of the lugs 114 to locate the socket 124 in alignment with the pin holes in the lugs.

To control the stroke of the cylinder 108 and therefore the position of the side panel at the back arch, the cylinder is equipped with a set of stroke control blocks 126. These blocks mount on the piston rod and limit the retraction of the piston rod into the cylinder. The cylinder 96 pinned to the top plates 44 is used for supporting and controlling the position of the top panel 76 at the back arch. As with the cylinders 108, stroke control blocks are employed to limit the position of the top panel. In this case, no support bar is required as the cylinder need not swing away for transport purposes.

Figure 7:
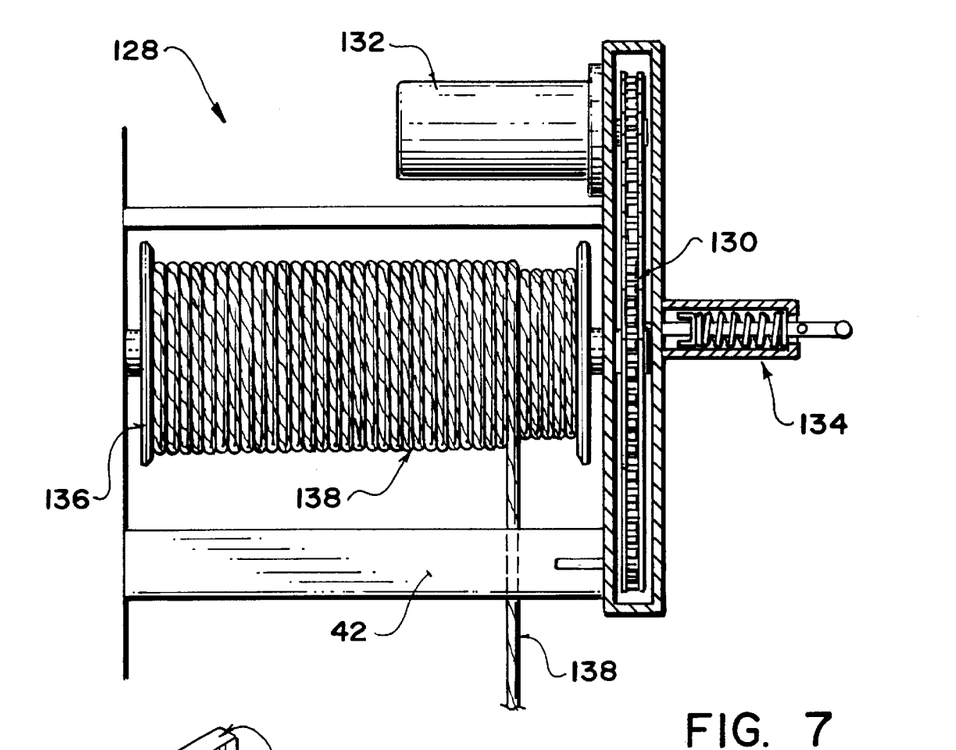
FIG. 7 is a side view, partially in section, of a drive winch assembly.

As discussed above, the bale bagger is advanced along a row of bales using a cable. The mechanism to achieve this includes a winch 128 mounted on the top side member 42 in front of the front arch 26. The winch is driven by a chain drive 130 by an hydraulic motor 132. The winch includes a spring set latch 134 that locks the drive the for winch. To release the winch to pull off the cable, the latch 134 is released. The winch includes a horizontal cable drum 136 driven by the chain drive.

Figures 6, 15:
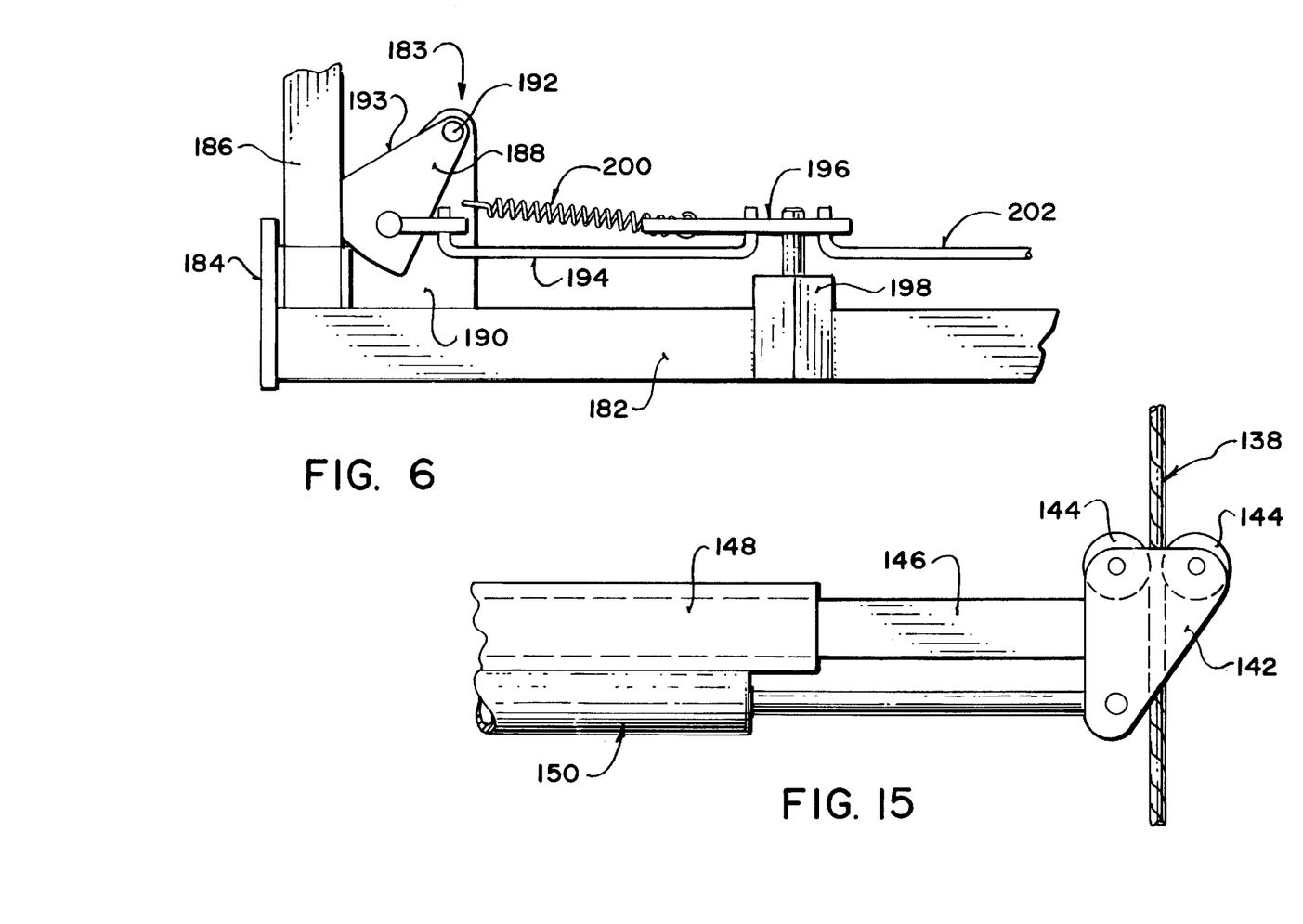
FIG. 6 is a detail of a latch for the drive wheel.
FIG. 15 illustrates a level wind mechanism.

A cable 138 wound on the drum 136 leads downwardly through a level wind mechanism 140. This includes a pair of plates 142 carrying a pair of sheaves 144 engaging opposite sides of the cable. The sheaves are mounted on a horizontal bar 146 which slides in a tube 148 mounted on the angle braces at the top corners of the front and back arches. The level wind mechanism is traversed along the cable drum with a hydraulic cylinder 150 fixed to the tube 148 and with its rod pinned to the plates 142.

Figure 8:
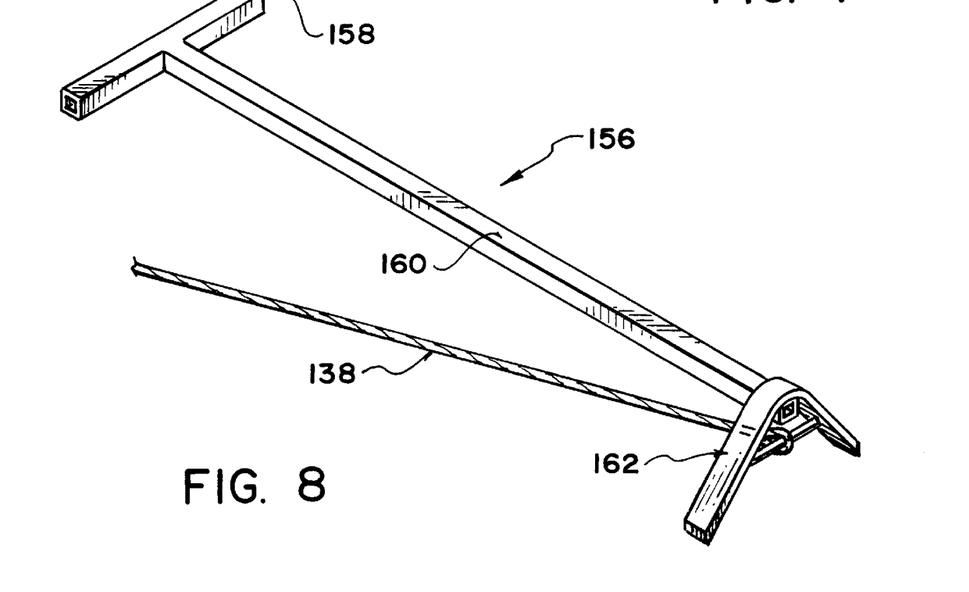
FIG. 8 is an isometric view of an anchor.

The cable passes down to the bottom of the bagger on one side. It then extends around a sheave 146 to the centre of the cross member 20, where is passes around another sheave 148 and extends to the front of the bagger. The cable extends along the full length of a row of bales to be bagged and is connected to an anchor 156 at that end. The anchor has a T-head 158 that engages the end-most bale of the row, a main arm 160 projecting from the T-head and a base 162 for holding the anchor on the ground. The arm 160 is sufficiently long that when the base of the anchor is drawn up to the center sheave 148, the last bale will have cleared the bagger.

The bagger has a self-propulsion system for travel in the bale yard. This system 164 includes a bracket 166 mounted on the top member 30 of the front arch. A wheel arm 168 is pivotally mounted on this bracket for movement between the solid line position illustrated in FIG. 1 and the in-use dotted line position shown in that same figure. The arm is moved between the two positions using a hydraulic cylinder 170 mounted on the top plates 44 and connected to the arm.

Figures 4, 5:
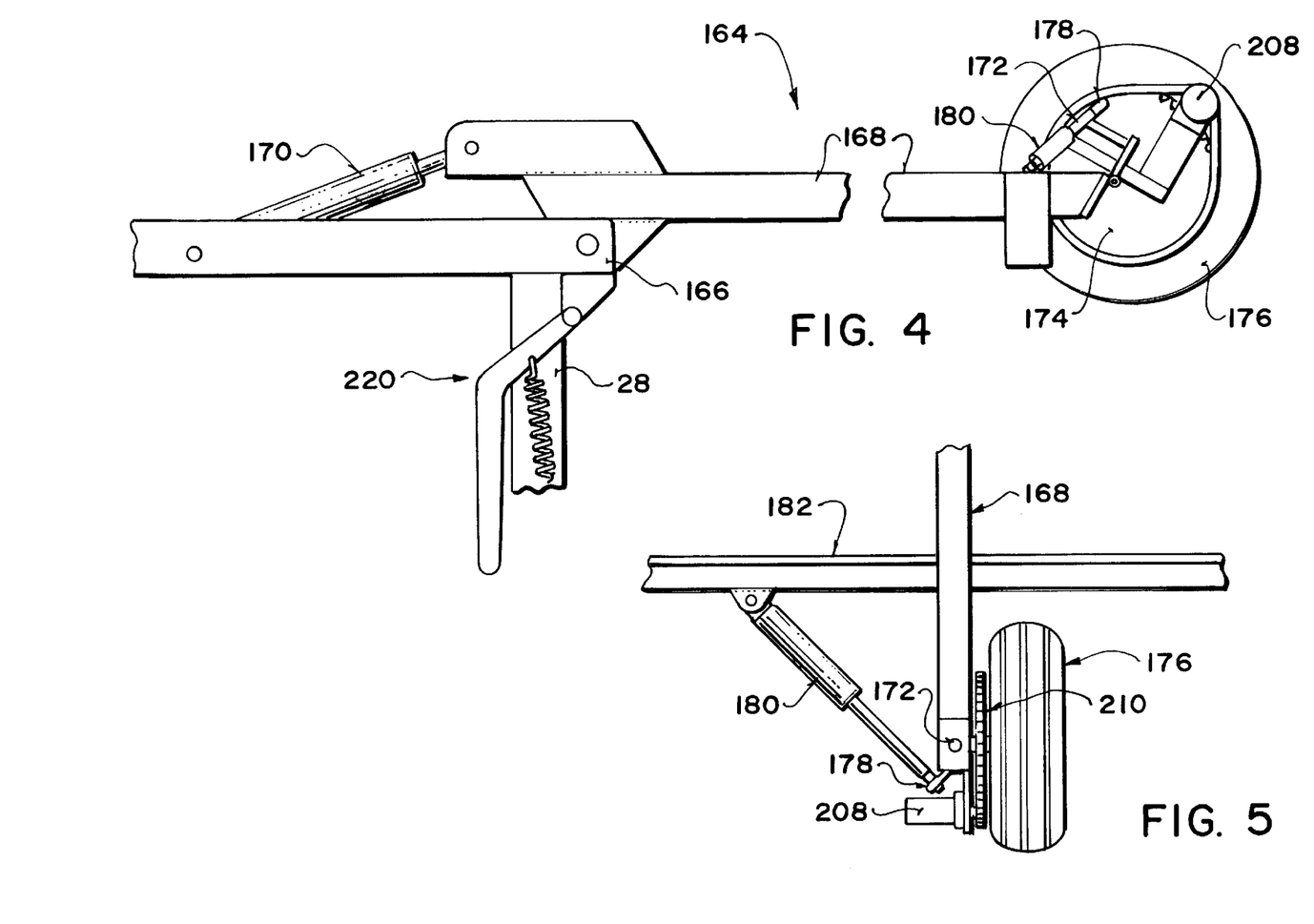
FIG. 4 is a detail side view of the transport wheel assembly.
FIG. 5 is a detail view showing the steering mechanism for the drive wheel.

At the end of the arm is a kingpin 172 arranged at an acute angle so that when the arm slopes down to the front in the use position, the kingpin is vertical. The kingpin carries a wheel hub 174 on which is mounted a drive wheel 176. A steering arm 178 is mounted on the wheel hub for rotation with the wheel about the king pin axis. A hydraulic cylinder 180 is connected to the steering arm and to a cross member 182 extending to opposite sides of the arm 168, across the bagger so that extension and contraction of the cylinder will steer the wheel to one side or the other.

At each end of the cross member 182 is a latch 183. This includes an end plate 184 on the arm for engagement with the outer side of a frame 186 mounted on the adjacent side member 12. Two latch members 188 are mounted on the arm 180 adjacent opposite ends. The latch member is pivotally mounted on a plate 190 by a pivot pin 192. The latch member has a camming face 193 that engages the frame 186 as the cross member 182 approaches the frame 186 to pivot the latch member to clear the part of the frame with which it is engaged.

The latch member is connected through a tie rod 194 to a release lever 196 pivotally mounted on a bracket 198 on the cross member 182. The release lever is biased to the closed position of the latch by a spring 200. Thus, when the latch member passes the frame member over which it is cammed, it will be spring-biased into the latched position.

A second tie rod 202 is connected to the release lever 196 and operates the latch member on the opposite side of the apparatus.

The drive mechanism 204 for the front wheel of the apparatus includes a hydraulic motor 208 mounted on the hub of the apparatus and a chain drive 210 coupling the motor output to the wheel.

The tunnel is completed with a set of four flexible plastic panels 216 that are mounted by hinges 218 on the corner braces of the front arch. These panels extend along the tunnel and bridge the gaps between the metal panels.

In use of the apparatus, the drive wheel is lowered to the use position and latched in place. This lifts the front wheels of the bagger off the ground. The drive wheel is then used to bring the bagger up to the end of a row of bales to be bagged. The drive system is then moved to its raised position, where it is latched in place using a mechanical latch 220. The cable drum 136 is released using the latch 134 and the cable is pulled forward from the apparatus to the far end of the row of bales. At that position, the cable is connected to the base of the anchor 156 and the T-head of the anchor is engaged firmly with the centre of the last bale in the row. At this point, the position of the side panels is adjusted as necessary using the winches 56 to ensure that the panels will be properly centred on the centre of the bales to be bagged. Stroke control blocks are inserted on the rear cylinders for the side and top panels, defining the final shape and size of the tunnel. Pins are used in the supports 84 to control the size of the tunnel at the front.

Figure 11:
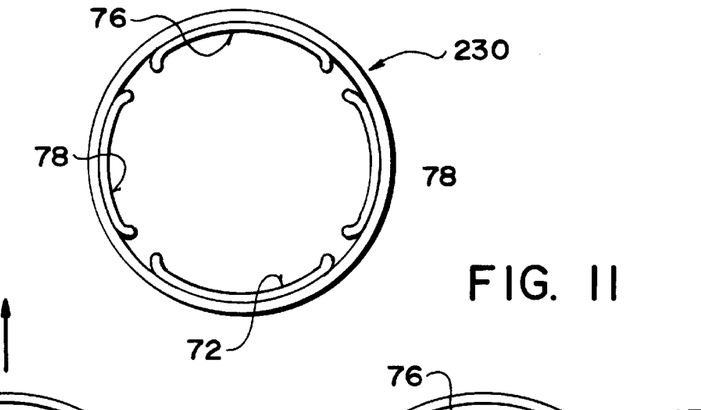
FIGS. 11 to 14 illustrate the dilation of a bagging tube.
Figure 12:
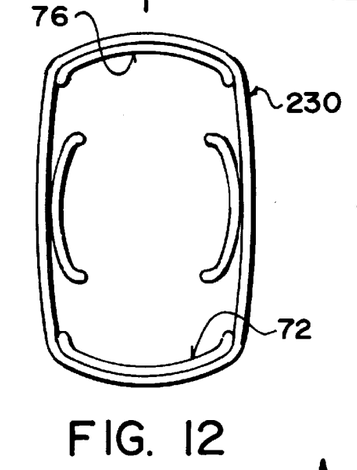
Figure 13:
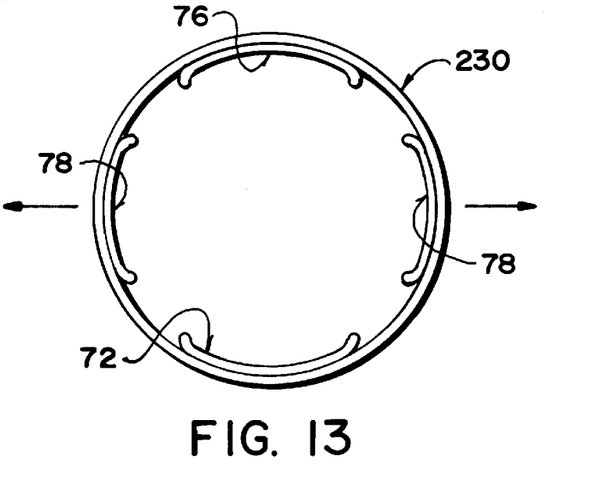
Figure 14:
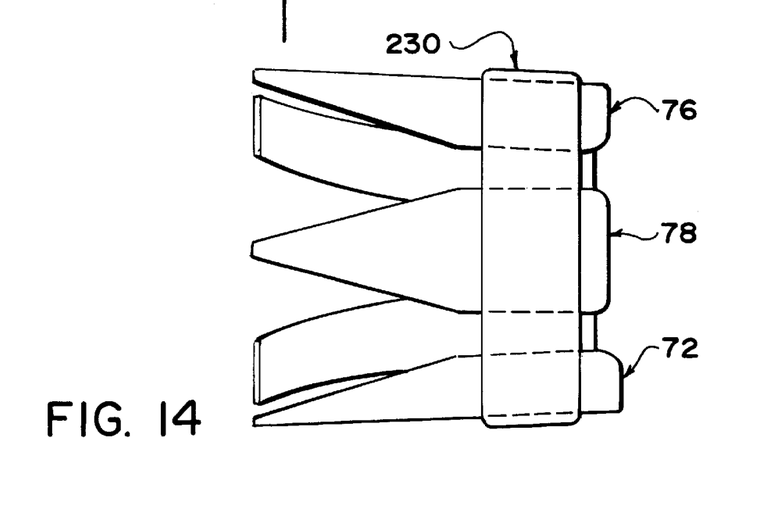

The cylinders are all extended to collapse the tunnel and the folded bagging tube 230 is placed on the tunnel behind the back arch 34 as shown in FIG. 11. The top cylinder 96 at the back is then retracted as shown in FIG. 12 to dilate the bag uniformly from top to bottom. The side panels 78 are then pulled out simultaneously as illustrated in FIG. 13 to yield equal dilation all the way around the tube. The use of panels 72, 76 and 78 of uniform size all the way around provides a uniform stretch in the tube 230. Once the tube is fully dilated, the front of the tunnel is expanded to be slightly larger than the rear end of the tunnel using cylinders 90 and 102, as illustrated in FIG. 14. This procedure yields uniform dilation without causing slippage of the tube off the rear end of the tunnel. There is insufficient taper on the tunnel to cause the bag to crowd rearwards.

The winch 128 is then actuated to reel in the cable, pulling the bagger towards the row of bales. The guide bars 18 and the pickup rails 22 centre the bagger on the bales and lift the bales up into the tunnel where they travel along the tunnel, compressed on all sides by the metal panels and the four flexible plastic panels 216. This compression of the bale bends stems projecting from the bale over and compresses them against the bale so that as the bale leaves the rear end of the tunnel, the stems are retained in their folded over position by the tube coming off the rear end of the tunnel so that the stems do not poke through the plastic tube. The bottom panel projects slightly beyond the side and top panels. This carries the bale far enough through the tunnel so that when it drops to the ground as it leaves the tunnel, it is spaced out past the top and side panels. This has been found to cause the bag to be pulled against the next bale at the top, which cushions the release of the bag.

As noted above, the terminal ends of the metal tunnel panels are well rounded. This eliminates corners that can cut and stretch the plastic film. The large radius of the panels provides a very gentle action along the edge where the bag comes off the panel. In addition, the release of the tube from the tunnel is quite gradual and again more gentle than would be the case with an abrupt release of the tube from a circular tunnel end.

While one embodiment of the present invention has been described in the foregoing, it is to be understood that other embodiments are possible within the scope of the invention and are intended to be included herein. The invention is to be considered limited solely by the scope of the appended claims.

I claim:

1. A bale bagging apparatus for inserting bales sequentially into a tube of plastic film, the apparatus comprising:

means for passing the bales in sequence along a bale path through a bagging station from an upstream side to a downstream side of the bagging station;

tube support means for supporting the tube of plastic film in a folded condition around the bagging station, the tube support means comprising a plurality of rigid panels spaced around the bagging station, each having a width dimension oriented laterally of the bale path at the bagging station, each panel having a convex lateral curvature;

a plurality of flexible sheets spaced around the bagging station inside the tube support means, each sheet extending laterally beyond adjacent sides of two adjacent panels and overlapping the adjacent panels; and tube opening means for moving at least selected ones of the panels radially with respect to the bale path.

2. A bale bagging apparatus according to claim 1 comprising a bottom fixed panel and a plurality of movable panels that are movable by the tube opening means.

3. A bale bagging apparatus according to claim 2 wherein the movable panels consist of a top panel and two side panels.

4. A bale bagging apparatus according to claim 1 wherein each panel has opposite lateral edges that are curved inwardly with respect to the bale path.

5. A bale bagging apparatus according to claim 1 wherein each sheet comprises a resilient synthetic plastic material.

6. Apparatus according to claim 1 wherein the tube opening means comprise a plurality of hydraulic cylinders.

7. Apparatus according to claim 6 including stop means for limiting the travel of the cylinders.

8. Apparatus according to claim 1 including support centring means for adjusting the orientation of the tube opening means to adjust the centre line of the bagging station.

9. A bale bagging apparatus according to claim 8 wherein the tube support means include a bottom fixed panel and a plurality of movable panels that are movable by the tube opening means.

10. A bale bagging apparatus according to claim 9 wherein the movable panels consist of a top panel and two side panels.

11. A bale bagging apparatus according to claim 10 wherein the support centring means comprise means mounting the side panels for vertical movement with respect to the bottom fixed panel.

* * * * *